(12) United States Patent
Suzuki

(10) Patent No.: US 10,137,784 B2
(45) Date of Patent: Nov. 27, 2018

(54) CONTROL DEVICE FOR ELECTRIC VEHICLE

(71) Applicant: HITACHI AUTOMOTIVE SYSTEMS, LTD., Hitachinaka-shi, Ibaraki (JP)

(72) Inventor: Keisuke Suzuki, Kawasaki (JP)

(73) Assignee: HITACHI AUTOMOTIVE SYSTEMS, LTD., Hitchinaka-Shi (JP)

(*) Notice: Subject to any disclaimer, the term of this patent is extended or adjusted under 35 U.S.C. 154(b) by 0 days.

(21) Appl. No.: 14/915,806

(22) PCT Filed: Sep. 3, 2014

(86) PCT No.: PCT/JP2014/073123
§ 371 (c)(1),
(2) Date: Mar. 1, 2016

(87) PCT Pub. No.: WO2015/045759
PCT Pub. Date: Apr. 2, 2015

(65) Prior Publication Data
US 2016/0214486 A1 Jul. 28, 2016

(30) Foreign Application Priority Data
Sep. 26, 2013 (JP) ................................. 2013/200436

(51) Int. Cl.
*B60L 3/10* (2006.01)
*B60T 8/175* (2006.01)
(Continued)

(52) U.S. Cl.
CPC ............... *B60L 3/108* (2013.01); *B60L 3/106* (2013.01); *B60L 7/12* (2013.01); *B60L 7/18* (2013.01);
(Continued)

(58) Field of Classification Search
CPC .......... B60L 2240/547; B60L 2210/10; B60L 2220/16; B60L 2240/486; B60L 2200/26;
(Continued)

(56) References Cited

U.S. PATENT DOCUMENTS 4,671,577 A * 6/1987 Woods .................... B60L 3/108
180/165
5,450,324 A * 9/1995 Cikanek .................. B60L 3/102
303/20
(Continued)

FOREIGN PATENT DOCUMENTS

EP 2 612 796 A1 7/2013
EP 2 626 259 A1 8/2013
(Continued)

*Primary Examiner* — Courtney D Heinle
*Assistant Examiner* — Luis A Martinez Borrero
(74) *Attorney, Agent, or Firm* — Foley & Lardner LLP

(57) ABSTRACT

Provided is a control device for an electric vehicle capable of stabilizing vehicle behavior when performing slip control of drive wheels. The control device for an electric vehicle according to the present invention is a control device for an electric vehicle to be used in an electric vehicle, the electric vehicle including: a motor which is connected to the drive wheels of the electric vehicle via a differential gear and a drive shaft, and which is configured to generate a braking or driving torque for each of the drive wheels; and a mechanical braking device capable of independently generating a braking force for each of the drive wheels. In this control device for an electric vehicle, when a slip ratio of each of the drive wheels is detected as being a predetermined slip ratio or more, a torque absolute value of the motor is reduced so that the slip ratio of each of the drive wheels is a target motor slip ratio, and a larger braking force is applied by the mechanical braking device to, of a right drive wheel and a
(Continued)

left drive wheel, the drive wheel having a higher wheel speed than the drive wheel having a lower wheel speed.

20 Claims, 4 Drawing Sheets

(51) Int. Cl.
  *B60L 7/12* (2006.01)
  *B60L 7/26* (2006.01)
  *B60L 11/18* (2006.01)
  *B60L 15/20* (2006.01)
  *B60L 7/18* (2006.01)
(52) U.S. Cl.
  CPC ............. *B60L 7/26* (2013.01); *B60L 11/1805* (2013.01); *B60L 11/1868* (2013.01); *B60L 11/1877* (2013.01); *B60L 15/20* (2013.01); *B60T 15/2009* (2013.01); *B60T 8/175* (2013.01); *B60L 2210/10* (2013.01); *B60L 2240/12* (2013.01); *B60L 2240/421* (2013.01); *B60L 2240/423* (2013.01); *B60L 2240/461* (2013.01); *B60L 2240/465* (2013.01); *B60L 2260/44* (2013.01); *B60T 2201/14* (2013.01); *Y02T 10/645* (2013.01); *Y02T 10/7005* (2013.01); *Y02T 10/7066* (2013.01); *Y02T 10/7216* (2013.01); *Y02T 10/7275* (2013.01)
(58) Field of Classification Search
  CPC .. B60L 2240/445; B60L 2240/12; B60L 7/26; B60L 2260/28; B60L 2270/145; B60L 3/10; B60L 11/12; B60L 7/10; B60L 15/20; B60T 8/4059; B60T 2230/08; B60T 2250/02; B60T 2260/08; B60T 2270/613; B60T 8/17557
  USPC ......... 701/36, 51, 55, 70, 88, 105, 112, 115, 701/117, 54, 74, 85, 89, 1, 22, 23, 80, 67
  See application file for complete search history.

(56) References Cited

U.S. PATENT DOCUMENTS

| | | | |
|---|---|---|---|
| 5,472,265 A | 12/1995 | Ohnuma | |
| 6,033,041 A * | 3/2000 | Koga | B60L 7/12 188/159 |
| 6,086,166 A * | 7/2000 | Fukasawa | B60L 3/0023 303/122.04 |
| 8,612,074 B2 * | 12/2013 | Minarcin | B60W 10/08 701/22 |
| 8,612,076 B2 * | 12/2013 | Maini | B60L 3/10 188/350 |
| 8,788,144 B2 * | 7/2014 | Krueger | B60L 3/10 701/36 |
| 9,463,782 B2 * | 10/2016 | Kikawa | B60L 7/18 |
| 2002/0180266 A1 * | 12/2002 | Hara | B60K 6/44 303/152 |
| 2005/0143878 A1 * | 6/2005 | Park | B60K 6/48 701/22 |
| 2005/0274560 A1 * | 12/2005 | Wakao | B60L 3/102 180/197 |
| 2006/0071551 A1 | 4/2006 | Taniguchi et al. | |
| 2006/0220453 A1 * | 10/2006 | Saito | B60L 7/26 303/152 |
| 2007/0038340 A1 * | 2/2007 | Sekiguchi | B60L 3/10 701/22 |
| 2009/0076699 A1 * | 3/2009 | Osaki | B60T 7/22 701/78 |
| 2009/0115246 A1 * | 5/2009 | Yanagida | B60K 28/16 303/144 |
| 2010/0113215 A1 * | 5/2010 | Jager | B60L 7/26 477/29 |
| 2010/0121515 A1 * | 5/2010 | Izumi | B60W 10/08 701/22 |
| 2011/0074204 A1 * | 3/2011 | Kim | B60L 7/12 303/3 |
| 2011/0148184 A1 * | 6/2011 | Suzuki | B60L 3/108 303/3 |
| 2011/0251770 A1 * | 10/2011 | Minarcin | B60T 1/10 701/71 |
| 2012/0130581 A1 * | 5/2012 | Semsey | B60T 8/17555 701/22 |
| 2012/0133202 A1 * | 5/2012 | Mui | B60L 3/10 303/152 |
| 2012/0245818 A1 * | 9/2012 | Miki | B60K 28/16 701/85 |
| 2012/0319465 A1 * | 12/2012 | Koyama | B60T 1/10 303/3 |
| 2012/0323430 A1 * | 12/2012 | Nakamura | B60L 11/1803 701/22 |
| 2012/0325573 A1 * | 12/2012 | Miller | B60L 7/24 180/282 |
| 2013/0173127 A1 * | 7/2013 | Nakatsu | B60L 3/102 701/70 |
| 2013/0289809 A1 * | 10/2013 | Treharne | B60L 1/003 701/22 |
| 2015/0321564 A1 * | 11/2015 | Huh | B60W 10/188 701/22 |
| 2016/0082843 A1 * | 3/2016 | Semsey | B60L 7/22 701/70 |
| 2016/0096434 A1 * | 4/2016 | Nakaoka | B60L 3/102 701/78 |
| 2016/0221446 A1 * | 8/2016 | Suzuki | B60L 15/20 |
| 2016/0221468 A1 * | 8/2016 | Suzuki | B60L 15/20 |

FOREIGN PATENT DOCUMENTS

| | | |
|---|---|---|
| JP | 02-151538 A | 6/1990 |
| JP | 10-297462 A | 11/1998 |
| JP | 3438242 B2 | 8/2003 |
| JP | 2003-320929 A | 11/2003 |
| JP | 2008-265427 A | 11/2008 |
| WO | WO-2011/114557 A1 | 9/2011 |

* cited by examiner

CONTROL DEVICE FOR ELECTRIC VEHICLE

TECHNICAL FIELD

The present invention relates to a control device for an electric vehicle.

BACKGROUND ART

Hitherto, a technology described in Patent Literature 1 is known as a control device for an electric vehicle. In Patent Literature 1, in a vehicle having electric braking means and second braking means, in an antilock control device configured to prevent locking by any one of the electric braking means and the second braking means in accordance with a locked state of a wheel, when antilock control is started, braking force control is performed for reducing a braking force of the other of the electric braking means and the second braking means that is not performing the antilock control to zero by gradually reducing the braking force based on a pedal stepping force.

CITATION LIST

Patent Literature

PTL 1: JP 3438242 B2

SUMMARY OF INVENTION

Technical Problem

However, in the case of employing the above-mentioned control device in an electric vehicle, which is configured to control right and left wheels with one motor, when performing slip control with only the motor, correction cannot be performed even if there is a difference between the slip ratios of the right and left wheels. Therefore, there has been a problem in that when there is a difference between the slip ratios of the right and left wheels, an unnecessary yaw moment is produced due to a difference between the right and left braking forces, and hence vehicle stability cannot be ensured.

It is an object of the present invention to provide a control device for an electric vehicle capable of stabilizing vehicle behavior when performing slip control of the drive wheels.

Solution to Problem

In order to achieve the above-mentioned object, according to one embodiment of the present invention, there is provided a control device for an electric vehicle configured so as to be used in an electric vehicle, the electric vehicle including a motor which is connected to drive wheels of the vehicle via a differential gear and a drive shaft, and which is configured to generate a braking or driving torque for each of the drive wheels, and a mechanical braking device capable of independently generating a braking force for each of the drive wheels. In this control device for an electric vehicle, when a slip ratio of each of the drive wheels is detected as being a predetermined slip ratio or more, a torque absolute value of the motor is reduced so that the slip ratio of each of the drive wheels is a target motor slip ratio, and a larger braking force is applied by the mechanical braking device to, of a right drive wheel and a left drive wheel, the drive wheel having a higher wheel speed than the drive wheel having a lower wheel speed.

DESCRIPTION OF EMBODIMENTS

First Embodiment

Figure 1:
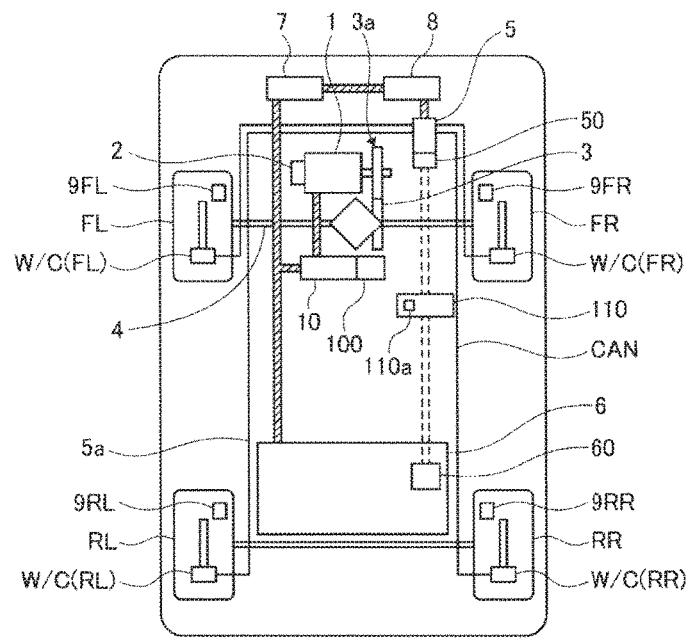
FIG. 1 is a system diagram for illustrating a configuration of an electric vehicle according to a first embodiment of the present invention.

FIG. 1 is a system diagram for illustrating a configuration of an electric vehicle according to a first embodiment of the present invention. The electric vehicle is a front wheel drive vehicle, and includes front wheels FR and FL, which are drive wheels, and rear wheels RR and RL, which are driven wheels. On each of the wheels, a wheel cylinder W/C(FL), W/C(FR), W/C(RL), or W/C(RR) (also simply referred to as W/C), which is configured to generate a friction braking force by pressing a brake pad to a brake rotor configured to integrally rotate with a tire, and a wheel speed sensor 9(FL), 9(FR), 9(RL), or 9(RR) (also simply referred to as 9), which is configured to detect a wheel speed of each wheel, are provided. To the wheel cylinder W/C, a hydraulic unit 5 is connected via a hydraulic pipe 5a.

The hydraulic unit 5 includes a plurality of solenoid valves, a reservoir, a pump motor, and a brake controller 50, and is configured to control, based on a command from the brake controller 50, drive states of the various solenoid valves and the pump motor, thereby controlling wheel cylinder hydraulic pressures for the respective wheels. Note that, the hydraulic unit 5 may be a widely known brake-by-wire unit, or a brake unit including a hydraulic circuit capable of carrying out vehicle stability control, and is thus not limited.

On an electric motor 1, which is a drive source, a resolver 2 configured to detect a motor rotational angle is provided. To the electric motor 1, a differential gear 3 is connected via a speed reduction mechanism 3a, and, to a drive shaft 4 connected to the differential gear 3, the front wheels FR and FL are connected. On a rear part of the vehicle, a high-voltage battery 6 configured to supply an electric power for driving to the electric motor 1, or recover a regenerative electric power, and a battery controller 60 configured to monitor and control a battery state of the high-voltage battery 6 are mounted. An inverter 10 interposed between the high-voltage battery 6 and the electric motor 1 is controlled by a motor controller 100. Moreover, to the high-voltage battery 6, an accessory battery 8 is connected via a DC-DC converter 7, and the accessory battery 8 functions as a power supply for driving of the hydraulic unit 5. On the electric vehicle according to the first embodiment, a CAN communication line is provided, which is an onboard communication line to which a plurality of controllers installed on the vehicle are connected. The brake controller 50, a vehicle controller 110, the battery controller 60, and the like are connected for mutual information communication.

Figure 2:
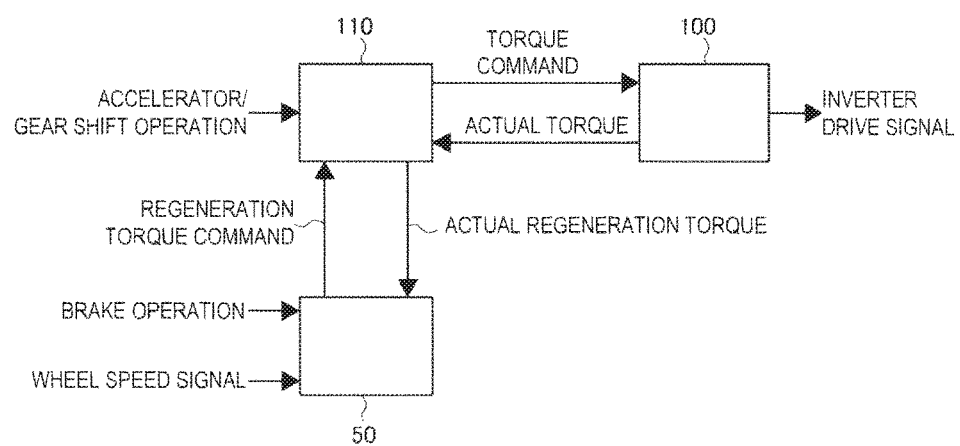
FIG. 2 is a control block diagram for illustrating contents of information to be transmitted or received by respective controllers according to the first embodiment.

FIG. 2 is a control block diagram for illustrating contents of information to be transmitted or received by the respective controllers according to the first embodiment. The vehicle controller 110 inputs accelerator pedal position information and shift position information, calculates a first torque command value based on a basic driver request torque and a result of a regeneration torque command value from the brake controller 50, and outputs the first torque command value to the motor controller 100. The brake controller 50 is configured to input an ON/OFF state of a brake switch representing a brake pedal operating state, information representing a braking intention of the driver, such as a brake pedal stroke amount or a brake pedal stepping force, and a wheel speed signal of each wheel, calculate a brake fluid pressure to be supplied to the wheel cylinder W/C and a regeneration torque that is generated by the electric motor 1, and output a regeneration torque command value to the vehicle controller 110. Note that, the brake controller 50 is configured to perform regeneration torque feedback control by receiving actual regeneration torque information from the vehicle controller 110. At the motor controller 100, the operating state of the electric motor 1 is controlled based on the torque command value, and actual torque information produced by the electric motor 1 based on a detected current value and the like is output to the vehicle controller 110.

Details Regarding Control in Controller

Figure 3:
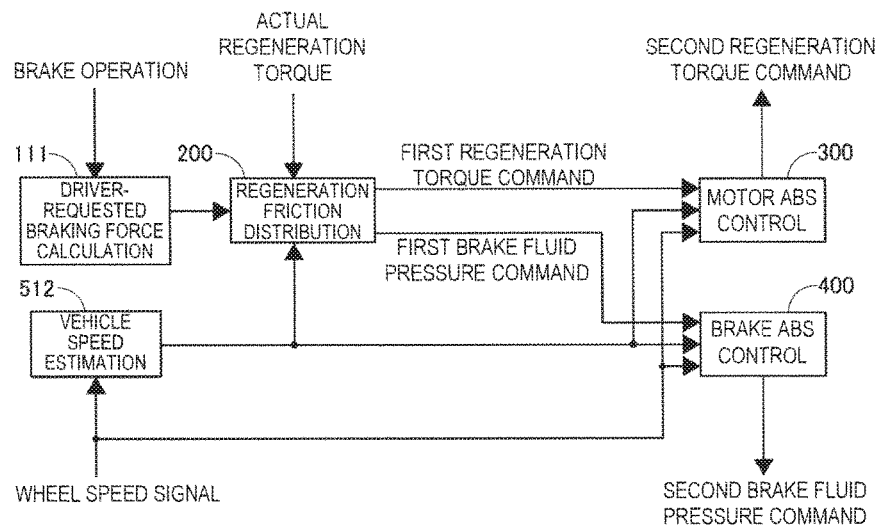
FIG. 3 is a control block diagram for illustrating a configuration of motor ABS control and brake ABS control according to the first embodiment.

FIG. 3 is a control block diagram for illustrating a control configuration for outputting a braking force request arranged in the brake controller according to the first embodiment. At a driver-requested braking force calculation unit 111, a driver-requested braking force (hereinafter also referred to as "driver-requested braking torque") is calculated based on the brake pedal operating state. At a vehicle speed estimation unit 512, a vehicle speed is estimated based on a detected wheel speed signal. Specifically, an average wheel speed of all the wheels may be employed, an average wheel speed of a rear wheel (driven wheel) side may be employed, or the value of the fastest wheel speed may be employed. Further, an estimated vehicle speed may be corrected based on vehicle deceleration and the like, and the vehicle speed estimation is not particularly limited. At a regeneration friction distribution control unit 200, a first regeneration torque command value generated by the electric motor 1 and a first brake fluid pressure command value generated by the wheel cylinder W/C are calculated based on the driver-requested braking force and the estimated vehicle speed, and the calculated values are output to a motor ABS control unit 300 and a brake ABS control unit 400. In this case, regarding the distribution between the regeneration torque and a fluid pressure braking torque, basically, when the driver-requested braking force is capable of being handled with only the regeneration torque, all of the driver-requested braking force is handled by the regeneration torque. Further, when the driver-requested braking force is more than an upper limit value of the regeneration torque, a difference between the driver-requested braking force and the regeneration torque upper limit value is compensated for by the fluid pressure braking torque.

At the motor ABS control unit 300, a wheel slip ratio s (i.e., a ratio of the wheel speed to the vehicle speed) is calculated based on the estimated vehicle speed and the drive wheel average wheel speed, and a second regeneration torque command value calculated based on the torque of the first regeneration torque command so that the wheel slip ratio s is a preset target motor slip ratio Sm is output. Note that, the regeneration torque controlled by the motor ABS control unit 300 is torque generated by the electric motor 1, which simultaneously acts on both the right and left front wheels FR and FL, which are the drive wheels, and hence the slip ratio is controlled based on the drive wheel average wheel speed. At the brake ABS control unit 400, a slip ratio is calculated based on the estimated vehicle speed and the wheel speed of each wheel, and a second brake fluid pressure command value calculated based on the fluid pressure of the first brake fluid pressure command value so that this slip ratio is a preset target brake slip ratio Sb is output.

Figure 4:
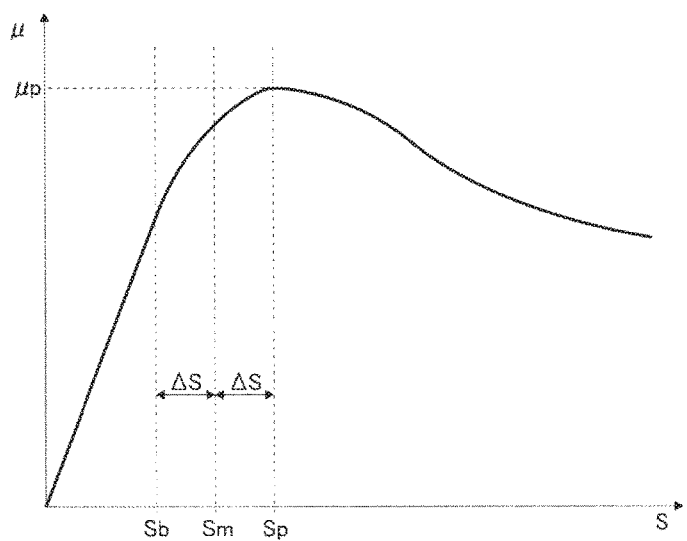
FIG. 4 is a characteristic diagram for showing a relationship between a μ-s characteristic and a target slip ratio according to the first embodiment.

A relationship between the target motor slip ratio Sm and the target brake slip ratio Sb is now described. FIG. 4 is a characteristic diagram for showing a relationship between a μ-s characteristic between a tire of the electric vehicle and a road surface (a change characteristic of a friction coefficient μ between the tire and the road surface with respect to the slip ratio s representing a level of slipping of the rotating tire during braking and when being driven), and each target slip ratio according to the first embodiment. Among the μ-s characteristics, when a slip ratio corresponding to a peak value μp at which a friction force is at a maximum is Sp, the target motor slip ratio Sm is set to be above a linear region on the slip ratio side lower than the peak value μp. The specific value is set to a value at which a sufficient braking force can be obtained in an actual conformance test.

Further, the target brake slip ratio Sb is the value at which the difference between the target motor slip ratio Sm and the slip ratio Sp corresponding to the peak value μp turns back toward the lower slip ratio side. In other words, the target brake slip ratio Sb is set so that Sp−Sm=Sm−Sb, namely, Sb=2Sm−Sp is satisfied. As a result, when the front right and left wheels are controlled so that one of the wheels converges to the target brake slip ratio Sb by brake ABS control, the other of the wheels converges to Sp, which is the peak value, due to the action of the differential gear 3, and hence a reduction in the total braking force of the front right and left wheels can be avoided. Note that, the target brake slip ratio Sb for brake ABS control is basically set so as to satisfy the relationship Sb=2Sm−Sp. However, when the actual regeneration torque becomes closer to the driver-requested braking force, the target brake slip ratio Sb becomes closer to the target motor slip ratio Sm. This point is described in more detail later.

ABS Control

Figure 5:
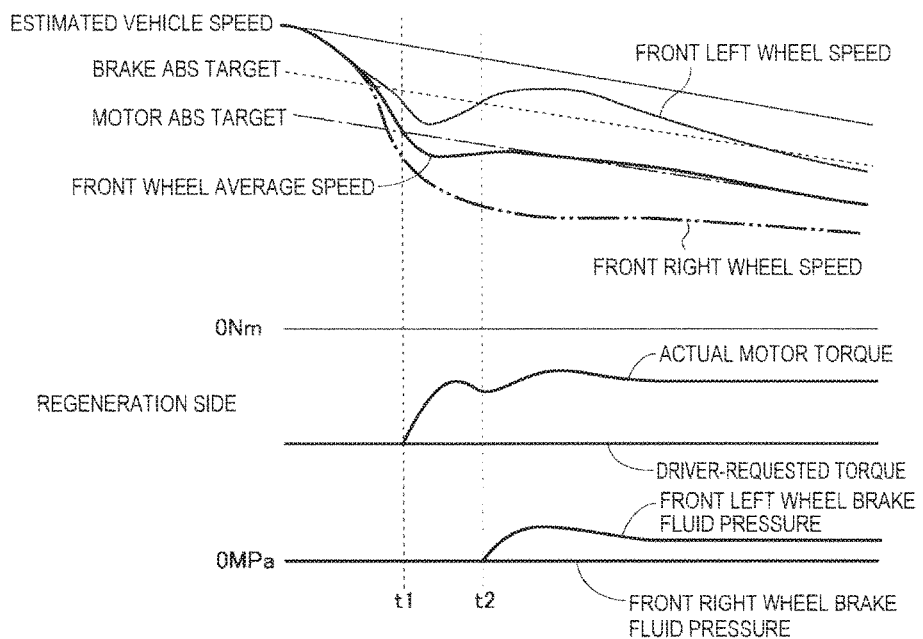
FIG. 5 is a time chart for illustrating an ABS control operation according to the first embodiment.

In the motor ABS control unit 300 and the brake ABS control unit 400, as a basic operation, when a slip is detected, the motor torque and the brake fluid pressure are controlled so as to converge to the target slip ratios (target motor slip ratio Sm and target brake slip ratio Sb). FIG. 5 is a time chart for illustrating an ABS control operation according to the first embodiment. At a time t1, when the right and left average wheel speed falls below the target motor slip ratio Sm, motor ABS control is performed so that the absolute value of the regeneration torque is reduced. At this stage, the right and left drive wheel speed is also reduced, and the friction coefficients of the right and left wheels may be different from each other depending on a road surface condition, disturbance, and the like. In the case of FIG. 5, when the friction coefficient of the right wheel speed is low and the reduction in the right wheel speed is large, the left wheel speed is increased by that amount due to the action of the differential gear 3. Thus, when the difference in wheel speeds between the right and left wheels increases, an unintended yaw moment is produced, which is an unpleasant sensation. Therefore, at a time t2, when the left wheel speed increases and falls below the target brake slip ratio (number of rotations exceeds a threshold), control is performed to apply brake fluid pressure to the wheel cylinder W/C on the left wheel so that the left wheel converges to the target brake slip ratio Sb. As a result, by applying a braking torque to the left wheel, a braking torque can be applied to the right wheel as well via the differential gear 3, enabling stable travel to be realized by suppressing unintended yaw moments.

Further, each ABS control unit includes a road surface friction coefficient estimation unit configured to estimate a road surface friction coefficient. The road surface friction coefficient estimation unit is configured to determine that a road surface of a predetermined friction coefficient μ0 or more is a high μ road, and a road surface of less than μ0 is a low μ road. During traveling along a road surface determined as being a high μ road, when a slip state is detected while it is determined that the driver-requested braking force cannot be realized unless brake fluid pressure by the wheel cylinder W/C is used in addition to the regeneration torque of the electric motor 1, the regeneration torque by the electric motor 1 is reduced to 0 and brake ABS control is performed while achieving the driver-requested braking force with only brake fluid pressure. As a result, an increase in the complexity of the control is avoided.

Next, a case in which a sudden change (μ jump) occurs from a low μ road to a high μ road is described. For a low μ road, a slip state occurs with only the regeneration torque, and deceleration is fairly small. Therefore, motor ABS control and brake ABS control are used together. In this state, when the vehicle travels to a high μ road, the slip ratio converges to the target motor slip ratio even if a sufficient braking force is generated by increasing the absolute value of the regeneration torque. In other words, the slip ratio of the right and left average drive wheel speed converges to the target motor slip ratio Sm, and hence the absolute value of the regeneration torque is increased to become closer to the driver-requested braking torque (or regeneration torque maximum value). At this stage, the target brake slip ratio Sb becomes closer to the target motor slip ratio Sm. Further, even if the regeneration torque is increased to the maximum regeneration torque value, the braking torque requested by the driver cannot be achieved. As a result, when the regeneration torque matches the driver-requested braking torque (maximum regeneration torque value), this means that ABS control for a high μ road is required. Therefore, the regeneration torque is reduced to zero, and brake ABS control is performed while achieving the driver-requested braking force with only brake fluid pressure. Note that, motor ABS control is not performed at this time, and hence even though the target motor slip ratio Sm is set to zero, Sm may be set to a predetermined low slip ratio or set so as to keep its original value.

Figure 6:
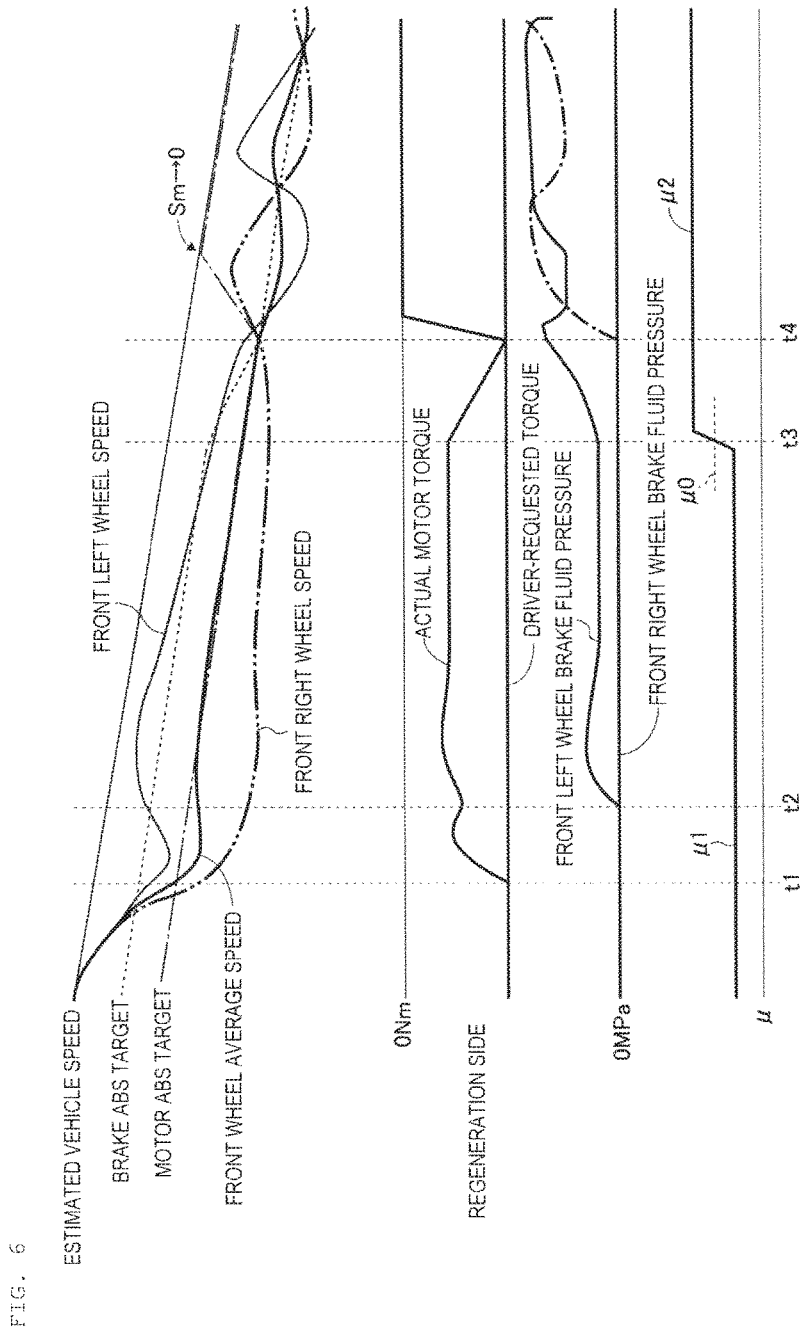
FIG. 6 is a time chart for illustrating an ABS control operation during a μ jump according to the first embodiment.

FIG. 6 is a time chart for illustrating an ABS control operation during a μ jump according to the first embodiment. The operations from the time t1 to the time t2 are the same as in FIG. 5, and hence a description thereof is omitted here. At a time t3, when a μ jump occurs and the road surface friction coefficient changes from μ1, which is a low μ, to μ2, which is a high μ that is greater than a predetermined friction coefficient μ0, the absolute value of the regeneration torque is increased to become closer to the driver-requested braking torque. At this stage, the target brake slip ratio Sb becomes closer to the target motor slip ratio Sm. At a time t4, when the regeneration torque matches the maximum regeneration torque value corresponding to the driver-requested torque, the regeneration torque is quickly reduced and the vehicle switches the control thereof to brake ABS control for generating a braking force by brake fluid pressure. As a result, stable ABS control can be realized. Note that, in normal brake ABS control, the wheel speed is controlled for each wheel, and hence a situation in which there is a large difference in the number of rotations between the right and left wheels such as with motor ABS control does not occur.

[Effect]

(1) Provided is the control device for an electric vehicle configured so as to be used in the electric vehicle, the electric vehicle including: the electric motor 1 which is connected to the drive wheels of the electric vehicle via the differential gear and the drive shaft 4, and which is configured to generate a braking or driving torque for each of the drive wheels; and the wheel cylinder W/C (mechanical braking device) capable of independently generating a braking force for each of the drive wheels, the control device for an electric vehicle including: the wheel speed sensor 9 (wheel speed detection unit) configured to detect a rotation speed of each of the drive wheels of the electric vehicle; the vehicle speed estimation unit 512 (vehicle speed calculation unit) configured to calculate a vehicle speed of the electric vehicle; and the motor ABS control unit 300 and the brake ABS control unit 400 (slip suppression control unit) configured to calculate a slip ratio of each of the drive wheels based on the calculated vehicle speed and the detected wheel speed of each of the drive wheels, and when a slip ratio of a predetermined slip ratio or more is detected, suppress a slip state so that the slip ratio of each of the drive wheels is a target motor slip ratio, the slip suppression control unit including: the motor ABS control unit 300 (motor slip suppression control unit) configured to reduce a torque absolute value of the electric motor 1 so that the slip ratio of each of the drive wheels is the target motor slip ratio Sm; and the brake ABS control unit 400 (drive wheel braking force control unit) configured to apply by the wheel cylinder W/C a larger braking force to, of the right drive wheel and the left drive wheel, the drive wheel having a higher wheel speed than the drive wheel having a lower wheel speed. In other words, by reducing the torque absolute value of the electric motor 1 and applying a large braking force by the wheel cylinder W/C to the drive wheel having a higher wheel speed, the slip ratio of the drive wheel having a higher wheel speed is increased to obtain a braking or driving force. In addition, the wheel speed of the drive wheel having a lower wheel speed is increased due to the action of the differential gear 3, which reduces the slip ratio, and as a result a braking or driving force for the right and left drive wheels can be obtained. This allows the difference between the right and left braking or driving forces to be reduced, enabling vehicle behavior to be stabilized without producing any unintended yaw moment.

(2) In the control device for an electric vehicle described in the above-mentioned item (1), the slip suppression control unit is further configured to perform the slip suppression control during braking. As a result, the vehicle attitude during braking can be stabilized.

(3) In the control device for an electric vehicle described in the above-mentioned item (1), the drive wheel braking force control unit is further configured to avoid application of a braking force to the drive wheel having a lower wheel speed. As a result, the difference between the right and left rotation speeds can be reduced, and hence vehicle stability during braking is improved.

(4) The control device for an electric vehicle described in the above-mentioned item (1) further includes: the road surface friction coefficient calculation unit configured to calculate a road surface friction coefficient during travelling; and the deceleration calculation unit configured to calculate deceleration of the electric vehicle, in which the slip suppression control unit is further configured to reduce the motor torque so as to be nearly zero when the calculated road surface friction coefficient is a predetermined friction coefficient or more and the calculated deceleration is a predetermined deceleration or more. As a result, when the electric vehicle is greatly decelerated on a high μ road, such as a road for which the requested braking force is not satisfied only by the regeneration torque of the electric motor 1, as control is performed with only a hydraulic brake, it is not necessary to mutually control the braking force by the electric motor 1 and the braking force by the brake fluid pressure, and hence control stability can be ensured.

(5) The control device for an electric vehicle described in the above-mentioned item (1) further includes: the requested braking force calculation unit configured to calculate a braking force requested by a driver; the actual braking force calculation unit configured to calculate an actual braking force generated by the electric vehicle; and the road surface friction coefficient calculation unit configured to calculate a road surface friction coefficient during travelling, in which the drive wheel braking force control unit is a control unit configured to suppress a slip state by the mechanical braking device so that the slip ratio of each of the drive wheels is a target brake slip ratio that is smaller than the target motor slip ratio, and in which the slip suppression control unit is further configured to cause, when the calculated road surface friction coefficient has changed from a first road surface friction coefficient to a second road surface friction coefficient that is higher than the first road surface friction coefficient, the target brake slip ratio to become closer to the target motor slip ratio as the actual braking force becomes closer to the requested braking force. As a result, when a μ jump to a high μ road has occurred, a braking force based on brake control can be obtained by increasing the absolute value of the regeneration torque to cause the target brake slip ratio Sb to become closer to the target motor slip ratio Sm.

(6) In the control device for an electric vehicle described in the above-mentioned item (5), the motor slip suppression control unit is further configured to reduce the target motor slip ratio to zero after the actual braking force has matched the requested braking force. Stable control can be realized by changing the control from motor ABS control to brake ABS control.

(7) Provided is the control device for an electric vehicle to be used in the electric vehicle, the electric vehicle including: the motor which is connected to the drive wheels of the electric vehicle via the differential gear and the drive shaft, and which is configured to generate a regeneration torque by each of the drive wheels; and the mechanical braking device capable of independently generating a braking force for each of the drive wheels, the control device for an electric vehicle including: the wheel speed detection unit configured to detect a rotation speed of each of the drive wheels of the electric vehicle; the vehicle speed calculation unit configured to calculate a vehicle speed of the electric vehicle; and the drive wheel slip control unit configured to calculate a slip ratio of each of the drive wheels based on the calculated vehicle speed and the detected wheel speed of each of the drive wheels obtained during the regeneration braking, and when a predetermined slip ratio or higher is detected, control the speed of each of the drive wheels so that the slip ratio of each of the drive wheels is a target slip ratio, the drive wheel slip control unit being further configured to reduce the generated regeneration torque of the motor to a predetermined target regeneration torque, and apply a larger braking force by the mechanical braking device to, of the right drive wheel and the left drive wheel, the drive wheel having a higher wheel speed than the drive wheel having a lower wheel speed, to thereby control the slip ratio of each of the drive wheels to the target slip ratio. Thus, by reducing the torque absolute value of the electric motor 1 and applying a large braking force by the wheel cylinder W/C to the drive wheel having a higher wheel speed, the slip ratio of the drive wheel having a higher wheel speed is increased to obtain a braking or driving force. In addition, the wheel speed of the drive wheel having a lower wheel speed is increased due to the action of the differential gear 3, which reduces the slip ratio, and as a result a braking or driving force for the right and left drive wheels can be obtained. This allows the difference between the right and left braking or driving forces to be reduced, enabling vehicle behavior to be stabilized without producing an unintended yaw moment.

(8) In the control device for an electric vehicle described in the above-mentioned item (7), the drive wheel slip control unit is further configured to avoid application of a braking force by the mechanical braking device to the drive wheel having a lower wheel speed. As a result, the difference between the right and left rotation speeds can be reduced, and hence vehicle stability during braking is improved.

(9) The control device for an electric vehicle described in the above-mentioned item (8) further includes: the road surface friction coefficient calculation unit configured to calculate a road surface friction coefficient during travelling; and the deceleration calculation unit configured to calculate deceleration of the electric vehicle, in which the drive wheel slip control unit is further configured to reduce the motor torque so as to be nearly zero when the calculated road surface friction coefficient is a predetermined road surface friction coefficient or more and the calculated deceleration is a predetermined deceleration or more. As a result, when the electric vehicle is greatly decelerated on a high μ road, such as a road for which the requested braking force is not satisfied only by the regeneration torque of the electric motor 1, as control is performed with only a hydraulic brake, it is not necessary to mutually control the braking force by the electric motor 1 and the braking force by the brake fluid pressure, and hence control stability can be ensured.

(10) The control device for an electric vehicle described in the above-mentioned item (9) further includes: the requested braking force calculation unit configured to calculate a braking force requested by a driver; the actual braking force calculation unit configured to calculate an actual braking force generated by the electric vehicle; and the road surface friction coefficient calculation unit configured to calculate a road surface friction coefficient during travelling, in which the drive wheel slip control unit is a control unit configured to suppress a slip state by the mechanical braking device so that the slip ratio of each of the drive wheels is a target brake slip ratio that is smaller than the target slip ratio, and in which the drive wheel slip control unit is further configured to cause, when the calculated road surface friction coefficient has changed from a first road surface friction coefficient to a second road surface friction coefficient that is higher than the first road surface friction coefficient, the target brake slip ratio to become closer to the target slip ratio as the actual braking force becomes closer to the requested braking force. As a result, when a μ jump to a high μ road has occurred, a braking force based on brake control can be obtained by increasing the absolute value of the regeneration torque to cause the target brake slip ratio to become closer to the target motor slip ratio.

(11) In the control device for an electric vehicle described in the above-mentioned item (10), the drive wheel slip control unit is further configured to reduce the target slip ratio to zero after the actual braking force has matched the requested braking force. As a result, stable control can be realized by changing the control from motor ABS control to brake ABS control.

(12) In the control device for an electric vehicle described in the above-mentioned item (7), the target slip ratio is set to a linear region on a slip ratio side lower than a slip ratio at a peak of a μ-s characteristic curve between a drive wheel and a road surface, thereby being capable of obtaining a sufficient braking force.

(13) In the control device for an electric vehicle described in the above-mentioned item (12), the target brake slip ratio is set to a linear region on a lower slip ratio side obtained by subtracting a difference between the peak slip ratio and the target slip ratio from the target slip ratio, thereby being capable of suppressing a reduction in the total braking force of the drive wheels.

(14) Provided is the control device for an electric vehicle, the electric vehicle including: the motor which is connected to the drive wheels of the electric vehicle via the differential gear and the drive shaft, and which is configured to generate a regeneration torque by each of the drive wheels; and the mechanical braking device capable of independently generating a braking force for each of the drive wheels, the control device for an electric vehicle including: the wheel speed detection unit configured to detect a rotation speed of each of the drive wheels of the electric vehicle; a vehicle speed calculation unit configured to calculate a vehicle speed of the electric vehicle; and a drive wheel slip control unit configured to calculate a slip ratio of each of the drive wheels based on the calculated vehicle speed and the detected wheel speed of each of the drive wheels obtained during the regeneration braking, and when a predetermined slip ratio or higher is detected, control the speed of each of the drive wheels so that the slip ratio of each of the drive wheels is a target slip ratio, the drive wheel slip control unit being further configured to reduce the generated regeneration torque of the motor to a predetermined target regeneration torque, and apply a braking force by the mechanical braking device only to, of the right drive wheel and the left drive wheel, the drive wheel having a lower wheel speed, thereby reducing the torque absolute value of the electric motor 1 and applying a large braking force by the wheel cylinder W/C to the drive wheel having a higher wheel speed. Thus, the slip ratio of the drive wheel having a higher wheel speed is increased to obtain a braking or driving force. In addition, the wheel speed of the drive wheel having a lower wheel speed is increased due to the action of the differential gear 3, which reduces the slip ratio, and as a result a braking or driving force for the right and left drive wheels can be obtained. This allows the difference between the right and left braking or driving forces to be reduced, enabling vehicle behavior to be stabilized without producing an unintended yaw moment.

(15) The control device for an electric vehicle described in the above-mentioned item (14) further includes the deceleration calculation unit configured to calculate deceleration of the electric vehicle, in which the drive wheel slip control unit is further configured to reduce the motor torque so as to be nearly zero when the calculated deceleration is a predetermined deceleration or more. As a result, when the electric vehicle is greatly decelerated for which the requested braking force is not satisfied only by the regeneration torque of the electric motor 1, as control is performed with only a hydraulic brake, it is not necessary to mutually control the braking force by the electric motor 1 and the braking force by the brake fluid pressure, and hence control stability can be ensured.

(16) The control device for an electric vehicle described in the above-mentioned item (15) further includes the road surface friction coefficient calculation unit configured to calculate a road surface friction coefficient during travelling, in which the drive wheel slip control unit is further configured to reduce the motor torque so as to be nearly zero when the calculated road surface friction coefficient is a predetermined road surface friction coefficient or more. As a result, in a case of a high μ road, such as a road for which the requested braking force is not satisfied only by the regeneration torque of the electric motor 1, as control is performed with only a hydraulic brake, it is not necessary to mutually control the braking force by the electric motor 1 and the braking force by the brake fluid pressure, and hence control stability can be ensured.

(17) The control device for an electric vehicle described in the above-mentioned item (16) further includes: the requested braking force calculation unit configured to calculate a braking force requested by a driver; and the actual braking force calculation unit configured to calculate an actual braking force generated by the electric vehicle, in which the drive wheel slip control unit is a control unit configured to suppress a slip state by the mechanical braking device so that the slip ratio of each of the drive wheels is a target brake slip ratio that is smaller than the target motor slip ratio, and in which the drive wheel slip control unit is further configured to cause, when the calculated road surface friction coefficient has changed from a first road surface friction coefficient to a second road surface friction coefficient that is higher than the first road surface friction coefficient, the target brake slip ratio to become closer to the target slip ratio as the actual braking force becomes closer to the requested braking force. As a result, when a μ jump to a high μ road has occurred, a braking force based on brake control can be obtained by increasing the absolute value of the regeneration torque to cause the target brake slip ratio Sb to become closer to the target motor slip ratio Sm.

(18) In the control device for an electric vehicle described in the above-mentioned item (17), the drive wheel slip control unit is further configured to reduce the target slip ratio to zero after the actual braking force has matched the requested braking force. As a result, stable control can be realized by changing the control from motor ABS control to brake ABS control.

(19) In the control device for an electric vehicle described in the above-mentioned item (14), the target slip ratio is set to a linear region on a slip ratio side lower than a slip ratio at a peak of a μ-s characteristic curve between a drive wheel and a road surface, thereby being capable of obtaining a sufficient braking force.

(20) In the control device for an electric vehicle described in the above-mentioned item (19), the target brake slip ratio is set to a linear region on a lower slip ratio side obtained by subtracting a difference between the peak slip ratio and the target slip ratio from the target slip ratio, thereby being capable of suppressing a reduction in the total braking force of the drive wheels.

Note that, the embodiment of the present invention may also be configured as follows.

(1) A control device for an electric vehicle configured so as to be used in an electric vehicle, the electric vehicle including:

a motor which is connected to drive wheels of the electric vehicle via a differential gear and a drive shaft, and which is configured to generate a braking or driving torque for each of the drive wheels; and a mechanical braking device capable of independently generating a braking force for each of the drive wheels, the control device for an electric vehicle including:

a wheel speed detection unit configured to detect a rotation speed of each of the drive wheels of the electric vehicle;

a vehicle speed calculation unit configured to calculate a vehicle speed of the electric vehicle; and a slip suppression control unit configured to calculate a slip ratio of each of the drive wheels based on the calculated vehicle speed and the detected wheel speed of each of the drive wheels, and when a slip ratio of a predetermined slip ratio or more is detected, suppress a slip state so that the slip ratio of each of the drive wheels is a target motor slip ratio, the slip suppression control unit including:

a motor slip suppression control unit configured to reduce a torque absolute value of the motor so that the slip ratio of each of the drive wheels is the target motor slip ratio; and a drive wheel braking force control unit configured to apply by the mechanical braking device a larger braking force to, of the right drive wheel and the left drive wheel, the drive wheel having a higher wheel speed than the drive wheel having a lower wheel speed.

(2) The control device for an electric vehicle described in Item (1), in which the slip suppression control unit is further configured to be operated during braking.

(3) The control device for an electric vehicle described in Item (2), in which the drive wheel braking force control unit is further configured to avoid application of a braking force to the drive wheel having a lower wheel speed.

(4) The control device for an electric vehicle described in Item (1), further including:

a road surface friction coefficient calculation unit configured to calculate a road surface friction coefficient during travelling; and a deceleration calculation unit configured to calculate deceleration of the electric vehicle, in which the slip suppression control unit is further configured to reduce the motor torque so as to be nearly zero when the calculated road surface friction coefficient is a predetermined friction coefficient or more and the calculated deceleration is a predetermined deceleration or more.

(5) The control device for an electric vehicle described in Item (1), further including:

a requested braking force calculation unit configured to calculate a braking force requested by a driver;

an actual braking force calculation unit configured to calculate an actual braking force generated by the electric vehicle; and a road surface friction coefficient calculation unit configured to calculate a road surface friction coefficient during travelling, in which the drive wheel braking force control unit is a control unit configured to suppress a slip state by the mechanical braking device so that the slip ratio of each of the drive wheels is a target brake slip ratio that is smaller than the target motor slip ratio, and in which the slip suppression control unit is further configured to cause, when the calculated road surface friction coefficient has changed from a first road surface friction coefficient to a second road surface friction coefficient that is higher than the first road surface friction coefficient, the target brake slip ratio to be closer to the target motor slip ratio as the actual braking force becomes closer to the requested braking force.

(6) The control device for an electric vehicle described in Item (5), in which the motor slip suppression control unit is further configured to reduce the target motor slip ratio to zero after the actual braking force has matched the requested braking force.

(7) A control device for an electric vehicle to be used in an electric vehicle, the electric vehicle including:

a motor which is connected to drive wheels of the electric vehicle via a differential gear and a drive shaft, and which is configured to generate a regeneration torque by each of the drive wheels; and a mechanical braking device capable of independently generating a braking force for each of the drive wheels, the control device for an electric vehicle including:

a wheel speed detection unit configured to detect a rotation speed of each of the drive wheels of the electric vehicle;

a vehicle speed calculation unit configured to calculate a vehicle speed of the electric vehicle; and a drive wheel slip control unit configured to calculate a slip ratio of each of the drive wheels based on the calculated vehicle speed and the detected wheel speed of each of the drive wheels obtained during the regeneration braking, and when a predetermined slip ratio or higher is detected, control the speed of each of the drive wheels so that the slip ratio of each of the drive wheels is a target slip ratio, the drive wheel slip control unit being further configured to reduce the generated regeneration torque of the motor to a predetermined target regeneration torque, and apply a larger braking force by the mechanical braking device to, of the right drive wheel and the left drive wheel, the drive wheel having a higher wheel speed than the drive wheel having a lower wheel speed, to thereby control the slip ratio of each of the drive wheels to the target slip ratio.

(8) The control device for an electric vehicle described in Item (7), in which the drive wheel slip control unit is further configured to avoid application of a braking force by the mechanical braking device to the drive wheel having a lower wheel speed.

(9) The control device for an electric vehicle described in Item (8), further including:

a road surface friction coefficient calculation unit configured to calculate a road surface friction coefficient during travelling; and a deceleration calculation unit configured to calculate deceleration of the electric vehicle, in which the drive wheel slip control unit is further configured to reduce the motor torque so as to be nearly zero when the calculated road surface friction coefficient is a predetermined road surface friction coefficient or more and the calculated deceleration is a predetermined deceleration or more.

(10) The control device for an electric vehicle described in Item (9), further including:

a requested braking force calculation unit configured to calculate a braking force requested by a driver;

an actual braking force calculation unit configured to calculate an actual braking force generated by the electric vehicle; and a road surface friction coefficient calculation unit configured to calculate a road surface friction coefficient during travelling, in which the drive wheel slip control unit is a control unit configured to suppress a slip state by the mechanical braking device so that the slip ratio of each of the drive wheels is a target brake slip ratio that is smaller than the target slip ratio, and in which the drive wheel slip control unit is further configured to cause, when the calculated road surface friction coefficient has changed from a first road surface friction coefficient to a second road surface friction coefficient that is higher than the first road surface friction coefficient, the target brake slip ratio to be closer to the target slip ratio as the actual braking force becomes closer to the requested braking force.

(11) The control device for an electric vehicle described in Item (10), in which the drive wheel slip control unit is further configured to reduce the target slip ratio to zero after the actual braking force has matched the requested braking force.

(12) The control device for an electric vehicle described in Item (7), in which the target slip ratio is set to a linear region on a slip ratio side lower than a slip ratio at a peak of a μ-s characteristic curve between a drive wheel and a road surface.

(13) The control device for an electric vehicle described in Item (12), in which the target brake slip ratio is set to a linear region on a lower slip ratio side obtained by subtracting a difference between the peak slip ratio and the target slip ratio from the target slip ratio.

(14) A control device for an electric vehicle, the electric vehicle including:

a motor which is connected to drive wheels of the electric vehicle via a differential gear and a drive shaft, and which is configured to generate a regeneration torque by each of the drive wheels; and a mechanical braking device capable of independently generating a braking force for each of the drive wheels, the control device for an electric vehicle including:

a wheel speed detection unit configured to detect a rotation speed of each of the drive wheels of the electric vehicle;

a vehicle speed calculation unit configured to calculate a vehicle speed of the electric vehicle; and a drive wheel slip control unit configured to calculate a slip ratio of each of the drive wheels based on the calculated vehicle speed and the detected wheel speed of each of the drive wheels obtained during the regeneration braking, and when a predetermined slip ratio or higher is detected, control the speed of each of the drive wheels so that the slip ratio of each of the drive wheels is a target slip ratio, the drive wheel slip control unit being further configured to reduce the generated regeneration torque of the motor to a predetermined target regeneration torque, and apply a braking force by the mechanical braking device only to, of the right drive wheel and the left drive wheel, the drive wheel having a lower wheel speed.

(15) The control device for an electric vehicle described in Item (14), further including a deceleration calculation unit configured to calculate deceleration of the electric vehicle, in which the drive wheel slip control unit is further configured to reduce the motor torque so as to be nearly zero when the calculated deceleration is a predetermined deceleration or more.

(16) The control device for an electric vehicle described in Item (15), further including a road surface friction coefficient calculation unit configured to calculate a road surface friction coefficient during travelling, in which the drive wheel slip control unit is further configured to reduce the motor torque so as to be nearly zero when the calculated road surface friction coefficient is a predetermined road surface friction coefficient or more.

(17) The control device for an electric vehicle described in Item (16), further including:

a requested braking force calculation unit configured to calculate a braking force requested by a driver; and an actual braking force calculation unit configured to calculate an actual braking force generated by the electric vehicle, in which the drive wheel slip control unit is a control unit configured to suppress a slip state by the mechanical braking device so that the slip ratio of each of the drive wheels is a target brake slip ratio that is smaller than the target motor slip ratio, and in which the drive wheel slip control unit is further configured to cause, when the calculated road surface friction coefficient has changed from a first road surface friction coefficient to a second road surface friction coefficient that is higher than the first road surface friction coefficient, the target brake slip ratio to be closer to the target slip ratio as the actual braking force becomes closer to the requested braking force.

(18) The control device for an electric vehicle described in Item (17), in which the drive wheel slip control unit is further configured to reduce the target slip ratio to zero after the actual braking force has matched the requested braking force.

(19) The control device for an electric vehicle described in Item (14), in which the target slip ratio is set to a linear region on a slip ratio side lower than a slip ratio at a peak of a μ-s characteristic curve between a drive wheel and a road surface.

(20) The control device for an electric vehicle described in Item (19), in which the target brake slip ratio is set to a linear region on a lower slip ratio side obtained by subtracting a difference between the peak slip ratio and the target slip ratio from the target slip ratio.

A description has been given of only some embodiments of the present invention, but it is readily understood by a person skilled in the art that various changes and improvements can be made to the exemplified embodiment without practically departing from the novel teachings and advantages of the present invention. Thus, forms to which such changes and improvements are made are also intended to be included in the technical scope of the present invention.

The present application claims a priority based on Japanese Patent Application No. 2013-200436 filed on Sep. 26, 2013. All disclosed contents including Specification, Scope of Claims, Drawings, and Abstract of Japanese Patent Application No. 2013-200436 filed on Sep. 26, 2013 are incorporated herein by reference in their entirety.

REFERENCE SIGNS LIST 1 electric motor
2 differential gear
3a speed reduction unit 4 drive shaft
5 fluid pressure unit
5a fluid pressure pipe
9 wheel speed sensor
10 inverter
50 brake controller
60 battery controller
100 motor controller
110 vehicle controller
W/C wheel cylinder

The invention claimed is:

1. A controller for an electric vehicle configured so as to be used in an electric vehicle, the electric vehicle comprising:
　a motor which is connected to drive wheels of the electric vehicle via a differential gear and a drive shaft, and which is configured to generate a braking or driving torque for each of the drive wheels;
　a mechanical braking device capable of independently generating a braking force for each of the drive wheels; and
　a wheel speed sensor configured to detect a rotation speed of each of the drive wheels of the electric vehicle,
　wherein the controller is configured to
　　calculate a vehicle speed of the electric vehicle;
　　calculate a slip ratio of each of the drive wheels based on the calculated vehicle speed and the detected wheel speed of each of the drive wheels, and when a slip ratio of a predetermined slip ratio or more is detected, suppress a slip state so that the slip ratio of each of the drive wheels is a target motor slip ratio;
　　reduce a torque absolute value of the motor so that the slip ratio of each of the drive wheels is the target motor slip ratio; and
　　apply, by the mechanical braking device, a larger braking force to, of the right drive wheel and the left drive wheel, the drive wheel having a higher wheel speed than the drive wheel having a lower wheel speed when the reduction in the torque absolute value of the motor causes the rotation speed of either of the drive wheels to fall below the target motor slip ratio.

2. The controller for an electric vehicle according to claim 1, wherein the controller is further configured to reduce the torque absolute value of the motor so that the slip ratio of each of the drive wheels is the target motor slip ratio, during braking.

3. The controller for an electric vehicle according to claim 2, wherein the controller is further configured to avoid application of a braking force to the drive wheel having the lower wheel speed.

4. The controller for an electric vehicle according to claim 1, wherein the controller is further configured to:
　calculate a road surface friction coefficient during travelling;
　calculate deceleration of the electric vehicle; and
　reduce the motor torque so as to be nearly zero when the calculated road surface friction coefficient is a predetermined friction coefficient or more and the calculated deceleration is a predetermined deceleration or more.

5. The controller for an electric vehicle according to claim 1, wherein the controller is further configured to:
　calculate a braking force requested by a driver;
　calculate an actual braking force generated by the electric vehicle;
　calculate a road surface friction coefficient during travelling;
　suppress a slip state by the mechanical braking device so that the slip ratio of each of the drive wheels is a target brake slip ratio that is smaller than the target motor slip ratio; and
　cause, when the calculated road surface friction coefficient has changed from a first road surface friction coefficient to a second road surface friction coefficient that is higher than the first road surface friction coefficient, the target brake slip ratio to be closer to the target motor slip ratio as the actual braking force becomes closer to the requested braking force.

6. The controller for an electric vehicle according to claim 5, wherein the controller is further configured to reduce the target motor slip ratio to zero after the actual braking force has matched the requested braking force.

7. A controller for an electric vehicle to be used in an electric vehicle, the electric vehicle comprising:
　a motor which is connected to drive wheels of the electric vehicle via a differential gear and a drive shaft, and which is configured to generate a regeneration torque by each of the drive wheels;
　a mechanical braking device capable of independently generating a braking force for each of the drive wheels; and
　a wheel speed sensor configured to detect a rotation speed of each of the drive wheels of the electric vehicle,
　wherein the controller is configured to
　　calculate a vehicle speed of the electric vehicle;
　　calculate a slip ratio of each of the drive wheels based on the calculated vehicle speed and the detected wheel speed of each of the drive wheels obtained during regeneration braking, and when a predetermined slip ratio or higher is detected, control the speed of each of the drive wheels so that the slip ratio of each of the drive wheels is a target slip ratio; and
　　reduce the generated regeneration torque of the motor to a predetermined target regeneration torque, and apply a larger braking force, by the mechanical braking device, to, of the right drive wheel and the left drive wheel, the drive wheel having a higher wheel speed than the drive wheel having a lower wheel speed when the reduction in the regeneration torque of the motor causes the rotation speed of either of the drive wheels to fall below the target slip ratio, to thereby control the slip ratio of each of the drive wheels to the target slip ratio.

8. The controller for an electric vehicle according to claim 7, wherein the controller is further configured to avoid application of a braking force by the mechanical braking device to the drive wheel having the lower wheel speed.

9. The controller for an electric vehicle according to claim 8, wherein the controller is further configured to:
　calculate a road surface friction coefficient during travelling;
　calculate deceleration of the electric vehicle, and
　reduce the motor torque so as to be nearly zero when the calculated road surface friction coefficient is a predetermined road surface friction coefficient or more and the calculated deceleration is a predetermined deceleration or more.

10. The controller for an electric vehicle according to claim 9, wherein the controller is further configured to:
　calculate a braking force requested by a driver;
　calculate an actual braking force generated by the electric vehicle;
　calculate a road surface friction coefficient during travelling;

suppress a slip state by the mechanical braking device so that the slip ratio of each of the drive wheels is a target brake slip ratio that is smaller than the target motor slip ratio; and cause, when the calculated road surface friction coefficient has changed from a first road surface friction coefficient to a second road surface friction coefficient that is higher than the first road surface friction coefficient, the target brake slip ratio to be closer to the target slip ratio as the actual braking force becomes closer to the requested braking force.

11. The controller for an electric vehicle according to claim 10, wherein the controller is further configured to reduce the target slip ratio to zero after the actual braking force has matched the requested braking force.

12. The controller for an electric vehicle according to claim 7, wherein the target slip ratio is set to a linear region on a slip ratio side lower than a slip ratio at a peak of a µ-s characteristic curve between a drive wheel and a road surface.

13. The controller for an electric vehicle according to claim 10, wherein the target brake slip ratio is set to a linear region on a lower slip ratio side obtained by subtracting a difference between the peak slip ratio and the target slip ratio from the target slip ratio.

14. A controller for an electric vehicle, the electric vehicle comprising:

a motor which is connected to drive wheels of the electric vehicle via a differential gear and a drive shaft, and which is configured to generate a regeneration torque by each of the drive wheels;

a mechanical braking device capable of independently generating a braking force for each of the drive wheels; and a wheel speed sensor configured to detect a rotation speed of each of the drive wheels of the electric vehicle, wherein the controller is configured to calculate a vehicle speed of the electric vehicle;

calculate a slip ratio of each of the drive wheels based on the calculated vehicle speed and the detected wheel speed of each of the drive wheels obtained during regeneration braking, and when a predetermined slip ratio or higher is detected, control the speed of each of the drive wheels so that the slip ratio of each of the drive wheels is a target slip ratio; and reduce the generated regeneration torque of the motor to a predetermined target regeneration torque, and apply a braking force, by the mechanical braking device, only to, of the right drive wheel and the left drive wheel, the drive wheel having a lower wheel speed when the reduction in the regeneration torque of the motor causes the rotation speed of either of the drive wheels to fall below the target slip ratio.

15. The controller for an electric vehicle according to claim 14, wherein the controller is further configured to:

calculate deceleration of the electric vehicle; and reduce the motor torque so as to be nearly zero when the calculated deceleration is a predetermined deceleration or more.

16. The controller for an electric vehicle according to claim 15, further comprising wherein the controller is further configured to:

calculate a road surface friction coefficient during travelling; and reduce the motor torque so as to be nearly zero when the calculated road surface friction coefficient is a predetermined road surface friction coefficient or more.

17. The controller for an electric vehicle according to claim 16, wherein the controller is further configured to:

calculate a braking force requested by a driver;

calculate an actual braking force generated by the electric vehicle;

suppress a slip state by the mechanical braking device so that the slip ratio of each of the drive wheels is a target brake slip ratio that is smaller than the target motor slip ratio; and cause, when the calculated road surface friction coefficient has changed from a first road surface friction coefficient to a second road surface friction coefficient that is higher than the first road surface friction coefficient, the target brake slip ratio to be closer to the target slip ratio as the actual braking force becomes closer to the requested braking force.

18. The controller for an electric vehicle according to claim 17, wherein the controller is further configured to reduce the target slip ratio to zero after the actual braking force has matched the requested braking force.

19. The controller for an electric vehicle according to claim 14, wherein the target slip ratio is set to a linear region on a slip ratio side lower than a slip ratio at a peak of a µ-s characteristic curve between a drive wheel and a road surface.

20. The controller for an electric vehicle according to claim 17, wherein the target brake slip ratio is set to a linear region on a lower slip ratio side obtained by subtracting a difference between the peak slip ratio and the target slip ratio from the target slip ratio.

* * * * *